(12) United States Patent
Iwaki et al.

(10) Patent No.: US 9,957,406 B2
(45) Date of Patent: May 1, 2018

(54) METHOD FOR SMOOTHING A PERFLUORO ALKOXY ALKANE FILM SURFACE

(71) Applicants: Masamichi Iwaki, Kasbihara (JP); Tadahiro Ohmi, Sendai (JP); Kenji Ohyama, Sendai (JP); Isao Akutsu, Chiba (JP)

(72) Inventors: Masamichi Iwaki, Kasbihara (JP); Tadahiro Ohmi, Sendai (JP); Kenji Ohyama, Sendai (JP); Isao Akutsu, Chiba (JP)

(73) Assignee: TOHOKU UNIVERSITY, Sendai-shi (JP)

( * ) Notice: Subject to any disclaimer, the term of this patent is extended or adjusted under 35 U.S.C. 154(b) by 408 days.

(21) Appl. No.: 14/638,391

(22) Filed: Mar. 4, 2015

(65) Prior Publication Data

US 2015/0225593 A1    Aug. 13, 2015

Related U.S. Application Data

(63) Continuation of application No. 14/233,427, filed as application No. PCT/JP2012/004151 on Jun. 27, 2012, now abandoned.

(30) Foreign Application Priority Data

Jul. 21, 2011    (JP) .................................. 2011-160358

(51) Int. Cl.
*C09D 129/10*    (2006.01)
*B05D 3/02*    (2006.01)
(Continued)

(52) U.S. Cl.
CPC ......... *C09D 129/10* (2013.01); *B05D 3/0209* (2013.01); *B05D 3/0254* (2013.01);
(Continued)

(58) Field of Classification Search
CPC ....... B05D 3/007; B05D 3/0254–3/029; F04D 19/04; F04D 19/042
See application file for complete search history.

(56) References Cited

U.S. PATENT DOCUMENTS 5,221,179 A    6/1993    Ikegami et al.
5,401,149 A    3/1995    Tsuru et al.
(Continued)

FOREIGN PATENT DOCUMENTS

GB    2473824    3/2011
JP    06-081788    3/1994
(Continued)

OTHER PUBLICATIONS

"Scientific Wet Process Technology for Innovative LSI/FPD Manufacturing" edited by Tadahiro Ohmi, Chapter 10 titled "Advanced Ultrapure Water and Liquid Chemical Supply System and Materials for Fluctuation-Fee Facility" by Ikunori Yokoi et. al., p. 370-373.*
(Continued)

*Primary Examiner* — Woody Lee, Jr.
*Assistant Examiner* — Brian O Peters
(74) *Attorney, Agent, or Firm* — Fitzpatrick Cella Harper and Scinto

(57) ABSTRACT

Method for increasing the smoothness of the free surface area of a PFA film, provided on a component by sequentially exposing it to a temperature higher than its melting temperature so as to melt at least the free surface area, lowering the temperature to solidify the melted portion, remelting the free surface area by exposing it to a temperature of at least the PFA melting temperature and again lowering the temperature. The PFA film may be provided on $Al_2O_3$, Ni or $NiF_2$ film.

4 Claims, 3 Drawing Sheets

(51) Int. Cl.
*F04C 18/16* (2006.01)
*F01C 21/08* (2006.01)
*F04C 2/12* (2006.01)
*F04C 27/00* (2006.01)

(52) U.S. Cl.
CPC .............. *F01C 21/08* (2013.01); *F04C 2/126* (2013.01); *F04C 18/16* (2013.01); *F04C 27/001* (2013.01); *F04C 2230/602* (2013.01); *F04C 2230/91* (2013.01); *F05C 2225/04* (2013.01)

(56) References Cited

U.S. PATENT DOCUMENTS

| | | |
|---|---|---|
| 5,716,680 A | 2/1998 | Martin et al. |
| 5,718,947 A | 2/1998 | Martin et al. |
| 5,993,907 A | 11/1999 | Aikman, Jr. |
| 6,905,306 B2 | 6/2005 | Englander et al. |
| 8,124,240 B2 | 2/2012 | Ohmi et al. |
| 8,362,627 B2 | 1/2013 | Gokhale et al. |
| 2003/0021672 A1* | 1/2003 | Maejima ................. F04D 19/04 415/90 |
| 2005/0018936 A1 | 1/2005 | Yoshimura et al. |
| 2006/0013959 A1* | 1/2006 | Morales ................... B05D 7/14 427/407.1 |
| 2006/0127245 A1* | 6/2006 | Ohmi ...................... F04C 18/16 417/410.2 |
| 2007/0267299 A1 | 11/2007 | Mitani |
| 2010/0196049 A1* | 8/2010 | Niimi ................... G03G 5/0546 399/159 |

FOREIGN PATENT DOCUMENTS

| | | |
|---|---|---|
| JP | 06-093988 | 4/1994 |
| JP | 2004-360855 | 12/2004 |

OTHER PUBLICATIONS

Innovative Manufacturing Techniques in Semiconductor and Display Industries (1), Technology Alliance Group, Inc., 443-47 (English translation).

* cited by examiner

METHOD FOR SMOOTHING A PERFLUORO ALKOXY ALKANE FILM SURFACE

This is a continuation of application Ser. No. 14/233,427 filed Jan. 17, 2014, which in turn is a National Phase of PCT/JP2012/004151 filed Jun. 27, 2012, which in turn claims benefit of Japanese application No. 2011-160358 filed Jul. 21, 2011.

TECHNICAL FIELD

The present invention relates to a screw rotor for a gas exhaust pump used in an apparatus for manufacturing semiconductor devices and electronic devices which use semiconductor-related technology, such as liquid crystal display devices, solar cells, organic EL devices, and LEDs (hereinafter referred to as "semiconductor application electronic devices"), or in an apparatus for manufacturing electronic components for the electronic devices, a method for manufacturing the screw rotor for a gas exhaust pump, a gas exhaust pump having the screw rotor, and a manufacturing method and an assembling method of the gas exhaust pump having the screw rotor.

BACKGROUND ART

As a gas exhaust pump capable of high-speed and long-time continuous operation, there is conventionally known, for example, a positive displacement screw pump having a pair of screw rotors in a stator (see NPL 1). Recently, there is a need for establishment of techniques for manufacturing gas exhaust pumps with variable-lead/variable-inclination-angle screws at a large scale and for commercialization by use of the techniques for the lower cost of the gas exhaust pumps with variable-lead/variable-inclination-angle screws since they have a pumping capability of a wide range from a molecular flow region to a viscous flow region, a constant pumping speed irrespective of the type of gas, and a high ultimate pressure.

Meanwhile, various types of pumps are used in an apparatus for manufacturing display devices which use semiconductor devices, liquid crystal, organic EL, and the like, and functional devices such as solar cell devices, due to limitations of application ranges depending on the pumping performance. Since the above-mentioned pump has a wide range of application of decompression and the pumping performance does not depend on the type of exhaust gas, there is no need to perform complicated works, such as replacement of a pump depending on the type of gas, placement of a pump in accordance with a change in pressure conditions, or preparation of a pump suitable for each pumping position in a production system having a plurality of pumping positions. If the use of a pump does not depend on a pumping speed, the same type of pump can be used, thereby eliminating troublesome selection of a pump for each pumping position. If the above type of pump becomes commercially available at low costs, it can be easily expected that such a type of pump will become widely popular and greatly contribute to the development of the industry.

FIG. 1 is a schematic view of an exemplary pump of the above-mentioned type. FIG. 2 is an enlarged schematic view of a portion shown by II in FIG. 1. A gas exhaust pump 100 with variable-lead/variable-inclination-angle screws includes an variable-lead/variable-inclination-angle female screw rotor 101 and an variable-lead/variable-inclination-angle male screw rotor 102. A screw engaging portion 104 is formed between the screw rotors 101 and 102, in which teeth and grooves are engaged with each other with a predetermined clearance to obtain a safe and smooth rotary motion. When the female and male screw rotors 101 and 102 are fixed to their rotating shaft (a rotating shaft of the female screw rotor 101 is not shown; a rotating shaft of the male screw rotor 102 is a rotating shaft 105), their engagement conditions are maintained. The screw rotors 101 and 102 are installed in a stator 106 with a predetermined gap provided between tooth top ends of the screw rotors 101 and 102 and an inner wall of the stator 106.

The rotating shaft 105 is rotatably mounted to a bearing body 116 via a holding means such as an angular bearing 107 (FIG. 1 shows four angular bearings 107a, 107b, 107c, and 107d for convenience). The male screw rotor 102 is fixed to the rotating shaft 105 and is rotated by the rotation of the rotating shaft 105. A lubricating oil supply path 109 is provided in the rotating shaft 105. A lubricating oil 111 is stored in a lubricating oil reservoir 112 provided at a predetermined position under a base plate 110. When the rotating shaft 105 receives a rotational force of a motor (not shown) via a rotary gear (not shown) and rotates, the rotation generates a centrifugal force so that the lubricating oil 111 rises by suction through the lubricating oil supply path 109 to be supplied to the angular bearing 107.

An oil seal member 113 for preventing the lubricating oil from diffusing is provided all around the rotating shaft 105 so as to seal a gap between the rotating shaft 105 and a seal housing 108 (they form an axis seal mechanism) as shown in FIG. 1 so that the lubricating oil 111 does not diffuse into a portion other than the angular bearing 107 through the gap between the rotating shaft 105 and the seal housing 108. However, providing only the oil seal member 113 may not be sufficient. Accordingly, a seal gas such as $N_2$ is supplied to the gap between the rotating shaft 105 and the seal housing 108 through a seal gas supply path 114 as shown by arrows in FIG. 1 to prevent the lubricating oil itself or its vapors from diffusing upstream of a vacuum system. The seal gas is supplied from the seal gas supply path 114, flows through a predetermined passage, and is discharged outside from a discharge path (not shown) with other gases used in semiconductor processes such as film deposition and etching.

As shown by the screw engaging portion 104, the female and male screw rotors 101 and 102 are engaged with each other. More specifically, a top end surface of a tooth of one screw rotor (a top end surface 201 of a tooth of the screw rotor 102) is engaged with a bottom end surface of the other screw rotor (a bottom end surface 202 of a groove of the screw rotor 101, which corresponds to a bottom end surface 202 of a groove of the screw rotor 102) with a small gap therebetween so that the screw rotors can smoothly rotate.

In the case of a pump including female and male screw rotors having a structure in which rotation is transmitted from one screw rotor to the other screw rotor via a gear or the like, in an engaging portion between the teeth and grooves of the female and male screw rotors, an inner surface of the groove of one screw rotor is generally configured to face an outer surface of the tooth of the other screw rotor with a small gap therebetween so as to maintain smooth rotation of the screw rotors.

In the case of a pump configured to transmit a rotation driving force of a rotation driving source, such as a motor, from the rotation driving source to a first screw rotor via a gear or the like and transmit the rotation driving force from the first screw rotor to a second screw rotor via an engaging portion, a side surface of a tooth and groove of the first screw rotor smoothly contacts a side surface of a tooth and groove of the second screw rotor so that the rotation driving force is smoothly and efficiently transmitted to the second screw rotor.

The screw pump of FIG. 1 has a pair of (twin) screw rotors. There is also a screw pump having a single screw rotor and configured to rotate the screw rotor for pumping in a state where a gap is provided between a top end surface of a tooth of the screw rotor and an inner wall surface of a stator (see PTL 1).

CITATION LIST

Patent Literature

PTL 1: Japanese Patent Laid-Open No. H06-081788(1994)

Non Patent Literature

NPL 1: "Innovative Manufacturing Techniques in Semiconductor and Display Industries (1)", Technology Alliance Group, Inc., pp. 443-447

SUMMARY OF INVENTION

Technical Problem

However, (1) regardless of whether the screw pump has a single screw rotor or twin screw rotors, a width of a gap between a screw portion 103 and the stator 106, and in addition to (1), (2) in the case of twin screw rotors, a width of a gap between the screw portions greatly influence the pumping performance of a pump. Accordingly, it is considered that a smaller width of a gap is preferable in order to increase a pumping speed. However, in view of the limitation of machining accuracy or the expansion caused by heat generated during operation, or in view of the fact that existence of a foreign matter such as dust, especially a hard foreign matter, in the gap causes the biting of screws and eventually damage to the pump, the gaps must be designed to have a certain width under the present circumstances.

To ensure safe rotation resulting from the width of a gap, the greater the rotation speed of the rotating shaft 105, the larger width of a gap is required.

The present invention has been made to solve the above problems, and in a gas exhaust pump having a screw rotor, a rotating shaft of the screw rotor, and a stator containing the rotatably-mounted screw rotor therein, it is an object of the present invention to provide a screw rotor that can ensure safe rotation even if a gap between the screw rotor and the stator is particularly smaller than that of a conventional one and can greatly increase a pumping performance of the pump, and a manufacturing method of the screw rotor.

It is a second object of the present invention to provide a gas exhaust pump having the screw rotor mechanism and a manufacturing method and an assembling method of the gas exhaust pump having the screw rotor.

Solution to Problem

To achieve the objects, a first aspect of the present invention is a screw rotor for a gas exhaust pump, the pump including a screw rotor, a rotating shaft fixed to the screw rotor or formed integrally with the screw rotor and rotatably engaging with a rotation driving means so as to rotate the screw rotor, and a holding means having a structure of rotatably holding the rotating shaft to allow high-speed rotation of the rotating shaft, wherein the screw rotor has a screw portion, and at least a top end surface of the screw portion facing an inner wall surface of a stator has a film of perfluoro alkoxy alkane (hereinafter referred to as "PFA") of the structural formula 1:

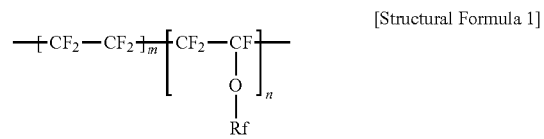

[Structural Formula 1]

wherein Rf is a perfluoro alkyl group and m and n are both positive integers (a first screw rotor).

The PFA of the present invention is a copolymer of tetrafluoroethylene and perfluoroalkyl vinyl ether including the structure of the structural formula 1. Examples of Rf include an alkyl group having two or more fluorine atoms, such as a fully fluorinated alkyl group. The number of carbon atoms in Rf is not particularly limited, but equal to or greater than 1, preferably equal to or greater than 2, and normally equal to or smaller than 12, preferably equal to or smaller than 6. The weight average molecular weight of the PFA of the present invention is not particularly limited, but preferably satisfies a melting point and a density characteristic as described later.

In a second aspect of the present invention, the PFA film in the first aspect is a film formed through a remelting process (a second screw rotor).

In a third aspect of the present invention, a manufacturing method of a screw rotor for a gas exhaust pump, the method including preparing a screw rotor having a coating film of PFA of the structural formula 1 on a top end surface of a tooth of a screw portion of the screw rotor, exposing the coating film to an atmosphere with a temperature higher than a melting temperature of PFA so as to melt at least a free surface area of the coating film, then exposing the coating film to an atmosphere with a temperature lower than the melting temperature of PFA so as to solidify at least a portion to be a free surface area, then exposing the coating film to an atmosphere with a temperature equal to the melting temperature of PFA or higher than the melting temperature of PFA so as to remelt at least the portion to be a free surface area, and then lowering the temperature of the atmosphere to a temperature sufficiently lower than the melting temperature of PFA so as to increase smoothness of the free surface of a solid film consisting of PFA (a manufacturing method of the first screw rotor).

In a fourth aspect of the present invention, a manufacturing method of a gas exhaust pump includes the processes defined in the manufacturing method of the screw rotor of the third aspect (a manufacturing method of a first pump).

In a fifth aspect of the present invention, an assembling method of a gas exhaust pump includes using the screw rotor of any one of the first to fourth aspects as an assembly part (an assembling method of the first pump).

In a sixth aspect of the present invention, a gas exhaust pump has the screw rotor of the first aspect.

In a seventh aspect of the present invention, a gas exhaust pump has the screw rotor of the second aspect.

Advantageous Effects of Invention

According to the gas exhaust pump of the present invention, the pumping performance is particularly high as compared to a conventional pump of a similar type and it is possible to maintain a certain rotation performance without causing erroneous rotation by high-speed, continuous, and longtime operation.

DESCRIPTION OF EMBODIMENTS

Figure 1:
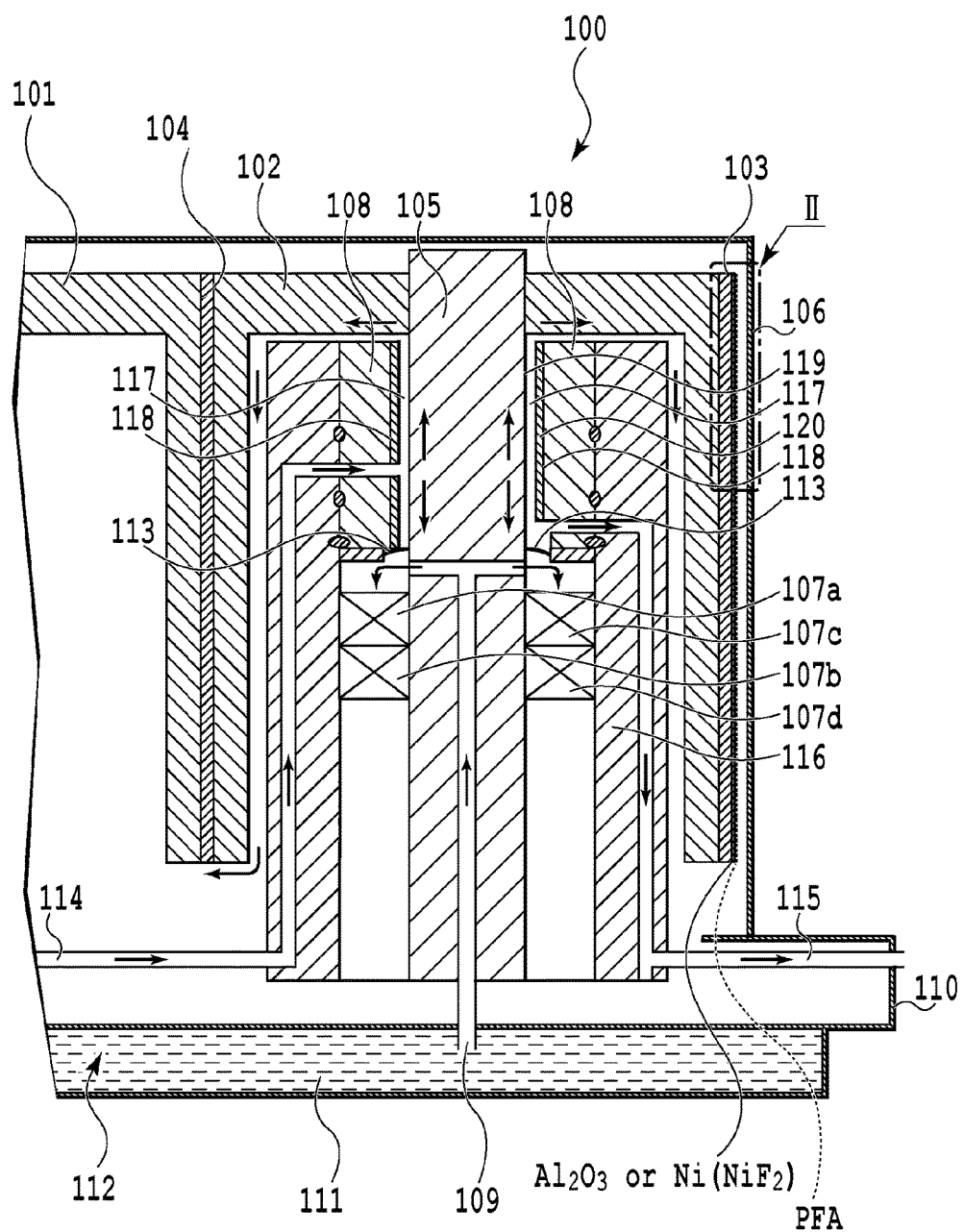
FIG. 1 illustrates a conventional gas exhaust pump and a feature of a gas exhaust pump of the present invention along with the conventional gas exhaust pump.
Figure 2:
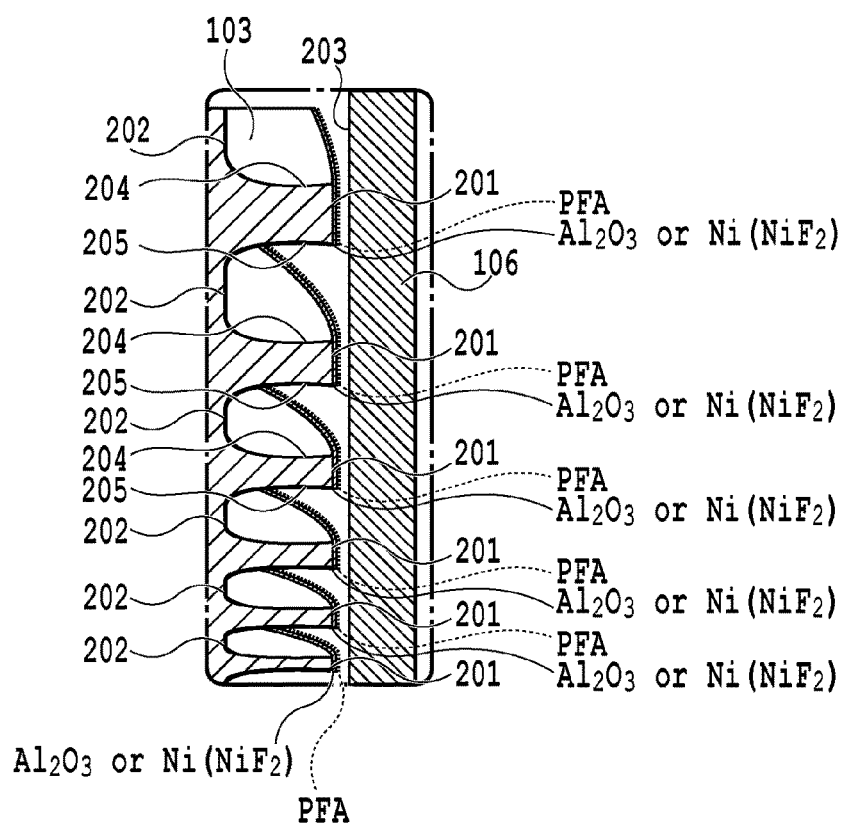
FIG. 2 is a schematic enlarged view of a portion shown by II in FIG. 1.

Hereinafter, embodiments of the present invention will be described with reference to the drawings.

When installed in a pump, the screw rotor of the present invention is placed with a gap between a top end surface 201 of a tooth of a screw portion 103 and an inner wall surface 203 of a stator 106. A PFA film is provided on the top end surface 201. If the PFA film of the present invention is provided in a predetermined manner, the width of the gap between the free surface of the PFA film and the inner wall surface 203 of the stator 106 can be made significantly smaller than that of a conventional one, so that the pumping performance is greatly improved. In addition, even with a little foreign matter entering the gap, the PFA film can prevent the occurrence of erroneous rotation due to the biting and damage to the pump.

After coating at least the top end surface 201 of the screw rotor with PFA, followed by melting and remelting processes, the PFA film is formed to have a high smoothness on its free surface. The PFA film may be provided not only on the top end surface 201, but also on a bottom end surface 202 or side inner wall surfaces 204, 205 of the screw portion 103. In particular, in the case of a pump of a twin rotor type, the pumping performance can be increased by providing the PFA film on the top end surface and the side inner surface of the screw portions of the female and male screw rotors.

The PFA of the structural formula 1 used in the present invention is manufactured by and available from many companies. Under the circumstances, it is desirable that the PFA of the present invention preferably have a melting point of 298° to 310° C. and a density of 2.12 to 2.17. Further, in a case where it is necessary to consider use under high temperature conditions, it is desirable that the PFA of the present invention be selected from PFA having a highest temperature for continuous use preferably of at least 260° C.

In a case where it is necessary to consider dissipation of heat generated due to high-speed continuous rotation or the like, it is desirable that the PFA of the present invention have a thermal conductivity equal to or higher than, for example, 0.25 W/m·k.

The melt viscosity of PFA is an important factor to form a film having a high surface smoothness and being free from waviness. If the melt viscosity is too high, it becomes difficult to obtain a high surface smoothness, and waviness occurs more frequently. It is desirable that the PFA of the present invention have a melt viscosity conforming to ASTM D3307 and preferably of 10 g/10 min or higher, more preferably of 20 g/10 min or higher. Of course, even with PFA having a relatively high melt viscosity, it is possible to obtain a PFA film having a high surface smoothness and being free from waviness as long as the coating is uniform and a sufficient melting time is given.

More specifically, the following PFA is preferably adopted.

(1) PFA available from Daikin Industries LTD.

AC-5539 (powder for coating polymer thick films using electrostatic coating).

Other PFA of the AC type includes AC-5600, ACX-21, ACX-31, ACX-31WH, ACX-34, and ACX-41.

In addition, AD-2CRE (coating film thickness: 10 to 15 μm) and AW-5000L (coating film thickness: 30 to 40 μm) can also be used. The manufacturer recommends that AD-2CRE and AW-5000L be used with a wire netting having 100 to 150 meshes and a wire netting having 60 to 80 meshes, respectively, for coating after filtration. As to the coating conditions of AD-2CRE, air spraying conditions preferably include a spray gun having a nozzle diameter of 1.0 mmϕ and a spraying pressure of 0.2 MPa. As to the coating conditions of AW-5000L, air spraying conditions preferably include a spray gun having a nozzle diameter of 1.0 to 1.2 mmϕ and a spraying pressure of 0.2 to 0.4 MPa.

Examples of preferable primers used in the present invention available from Daikin Industries LTD. include: ED-1939D21L, EK-1908S21L, EK-1909S21L, EK-1959S21L, EK-1983S21L, EK-1208M1L, EK-1209BKEL, EK-1209M10L, and EK-1283S1L as aqueous primers; and TC-1509M1, TC-1559M2, and TC-11000 as solvent-based primers.

In the case of EK-1909S21L, for example, a surface after being roughened with Tosa Emery Extra #80/#100=50.50 available from UJIDEN CHEMICAL INDUSTRY CO., LTD. is coated with the primer to have a thickness of about 10 μm by air spraying coating. A PFA film is provided on the coated surface.

The coating conditions of primer application include, for example, a spray gun having a nozzle diameter of 1.0 to 1.2 mmϕ and a spraying pressure of 0.2 to 0.4 MPa or a spray gun having a nozzle diameter of 1.0 to 1.5 mmϕ and a spraying pressure of 0.2 to 0.3 MPa. Drying is performed, for example, at a temperature of 80° to 90° C. and for a drying time of 10 to 15 minutes.

(2) PFA available from Du Pont-Mitsui Fluorochemicals Co., Ltd.

EM-500CL (for aqueous topcoat), EM-500GN (for aqueous topcoat), EM-700CL (for aqueous topcoat), EM-700GN (for aqueous topcoat), and EM-700GY (for aqueous topcoat). These are suitable for products to which electrostatic coating cannot be applied due to their complicated shapes.

In addition, the following PFA can also be used in the present invention: MP-102 (micropowder for topcoat), MP-103 (micropowder for topcoat), MP-300 (fluorinated powder for topcoat), MP-310 (fluorinated powder for topcoat), MP-630 (conductive powder), MP-642 (conductive powder), MP-620 (having a high thermal conductivity), MP-621 (having a high thermal conductivity), MP-622 (having a high thermal conductivity), MP-623 (having a high thermal conductivity), MP-501 (suitable for products to which electrostatic coating cannot be applied due to their complicated shapes), MP-502 (suitable for products to which electrostatic coating cannot be applied due to their complicated shapes), SL-800BK (including a carbon filler), and SL-800LT (including a glass filler).

Among the above-mentioned PFA, MP-103, MP-300, and MP-310 are preferable in the present invention since the obtained film has an excellent surface smoothness. In particular, MP-310 is especially preferable since it has control of a spherulite diameter of about 5 μm and is excellent in terms of size and uniformity.

SL-800BK is preferable in the present invention in terms of heat dissipation properties since it has a good thermal conductivity and excellent heat dissipation properties. From the viewpoint of having a good thermal conductivity and excellent heat dissipation properties, MP-630, 642 (conductive micropowder) are also used in the present invention as a preferable PFA material.

Among the above-mentioned PFA available from Du Pont-Mitsui Fluorochemicals Co., Ltd., an especially preferable PFA includes Rf of "—CF2CF2CF3" in the structural formula 1 and has a molecular weight of several hundreds of thousands to one million, a melting point of 300° to 310° C., a viscosity of 104 to 105 poise (380° C.), and a highest temperature for continuous use of 260° C.

Preferable primers are PFA Primer PL-902 Series sold as aqueous primers for general use and PFA Primer PL-910 Series sold as primers having excellent heat resistance and corrosion resistance. Their specific brand names are PL-902YL, PL-902BN, PL-902AL, PL-910YL, PL-910BN, PL-910AL, and PL-914AL.

(3) PFA available from Packing Land Co., Ltd.

NK-108 (lubricant, standard film thickness: 50 μm, heat resistant temperature: 260° C.), NK-372, 379 (lubricant, antistatic, standard film thickness: 100, 300 μm, heat resistant temperature: 260° C.), and NK-013, 013C (wear resistant, standard film thickness: 300 μm, heat resistant temperature: 150° C.).

(4) PFA available from 3M

PL-902YL, BN, AL (primer) and PL-910YL, BN, AL (primer).

(5) PFA available from NIPPON FUSSO CO., LTD.

NF-015 (standard film thickness: 50 μm), NF-015EC (standard film thickness: 40 μm, antistatic), and NF-020AC (standard film thickness: 600 μm, antistatic).

As a base material processed for the screw rotor of the present invention, a metal-based material having a good thermal conductivity and being suitable for the processing for workpieces is adopted, preferably stainless steel or an aluminum-based metal such as aluminum alloys.

In the screw pump of the present invention, the rotating shaft and the seal housing are engaged with each other via the angular bearing so that the rotating shaft is rotatable. Since the long-time, high-speed rotation generates frictional heat between the rotating shaft and the angular bearing, a base material with a good thermal conductivity is preferably selected to improve a heat dissipation effect of the rotating shaft and the seal housing.

For such a base material, a light aluminum-based metal is preferably selected. At the same time, it is preferable to select an aluminum-based metal that is as hard as possible and has a smaller thermal expansion coefficient. For an aluminum-based material, an aluminum alloy containing a metal other than aluminum in a pure aluminum is adopted in the present invention.

The aluminum alloy used in the present invention is made of metal containing aluminum as a main component. It is desirable that the metal containing aluminum as a main component be a metal containing normally 50% by mass or more of aluminum, preferably 80% by mass or more of aluminum, more preferably 90% by mass or more of aluminum, and still more preferably 94% by mass or more of aluminum. As a preferable metal contained in the aluminum alloy, at least one metal is selected from the group consisting of magnesium, titanium, and zirconium. In particular, magnesium is especially preferable since it increases the strength of the aluminum alloy.

Furthermore, the aluminum alloy used in the present invention may also be a metal containing a high-purity aluminum as a main component having a decreased content of specific elements (iron, copper, manganese, zinc, and chromium). The total content of specific elements is preferably 1.0% by mass or less, more preferably 0.5% by mass or less, and still more preferably 0.3% by mass or less.

The aluminum alloy including a high-purity aluminum as a main component may contain one or more other metals that may form an alloy with aluminum as necessary. Preferable metals include at least one metal selected from the group consisting of magnesium, titanium, and zirconium, but are not limited thereto, as long as they are other than the specific elements. In particular, magnesium is especially preferable since it increases the strength of the aluminum alloy. The concentration of magnesium is not particularly limited as long as it is in a range in which magnesium and aluminum can form an alloy, but is normally 0.5% by mass or more, preferably 1.0% by mass or more, and more preferably 1.5% by mass or more, to contribute to the sufficient increase in the strength. To form a uniform solid solution of magnesium and aluminum, the concentration of magnesium is preferably 6.5% by mass or less, more preferably 5.0% by mass or less, still more preferably 4.5% by mass or less, and most preferably 3.0% by mass or less.

In addition to the above-described metals, the aluminum alloy used in the present invention may contain other metallic elements as a crystal regulator. The metallic elements are not particularly limited as long as they have a sufficient effect of crystal control, but zirconium or the like is preferably used.

In the present invention, it is desirable that the content of each metal other than aluminum actively contained in the aluminum alloy be normally 0.01% by mass or more, preferably 0.05% by mass or more, and more preferably 0.1% by mass or more relative to the entire aluminum alloy. The lower limit of the content defines a required amount of the metal to fully exhibit its properties. However, the content of each metal is normally 20% by mass or less, preferably 10% by mass or less, more preferably 6% by mass or less, particularly preferably 4.5% by mass or less, and most preferably 3% by mass or less. The upper limit defines a required amount of the metal to form a uniform solid solution of aluminum and other metallic elements to maintain excellent material properties.

For a base material formed of stainless steel, SUS316 is preferably used for corrosion resistance, SUS316L for low-carbon steel, and SUS316L-EP which has a mirror-finished surface by electrolytic polishing for a base material with a smooth surface. However, the base material formed of stainless steel is not limited to the above-mentioned materials as long as a material suitable for purposes and conditions of use is selected. For example, iron-based alloy materials such as SCM 440, S45 are occasionally used for hardness.

On a base material (also referred to as a "workpiece") processed for the screw rotor for the screw pump of the present invention, it is preferable to give a desirable smoothness to at least a surface to be the top end surface of the tooth of the screw portion of the screw rotor by smoothing by way of P electrolytic polishing, mechanical polishing, or both. In the case of using electrostatic coating to coat the polished surface with PFA powder, it is desirable that the smoothness of the polished surface at this stage preferably be equal to or smaller than an average particle size of the PFA powder. However, the smoothness is not limited to this in a case where the PFA film is provided not directly on the polished surface of the base material.

To facilitate and ensure improvement of free surface smoothness and quality of the PFA film to be formed, it is desirable that a film of $Al_2O_3$, Ni, or $NiF_2$ (referred to as a "base film") be provided beforehand on the PFA film-provided surface. Providing beforehand a film of Ni or $NiF_2$ on the PFA film-provided surface can produce an effect of reducing pyrolysis of PFA when melting or remelting the PFA film provided on the surface, and therefore a film having a better quality can be obtained even if a higher melting temperature is set as compared to other base materials.

Furthermore, since an Ni film has a high corrosion resistance and a high adhesion to the PFA film, it is preferably used as a base film for the PFA film. To provide an Ni film on the PFA film-provided surface of a base material (workpiece), it is possible to use not only, for example, electroless nickel plating and plasma sputtering for depositing Ni by sputtering, but also MOCVD using an organic Ni complex. In the case of electroless nickel plating, a plating solution includes a reducing agent, and P (phosphorus) or B (boron) may be included in the obtained Ni film depending on the reducing agent to be used. In a case where hypophosphite is used for the reducing agent, it is possible to include P (phosphorus) in the obtained Ni film, while in a case where dimethylamineborane (DMAB) is used, it is possible to include B (boron) in the Ni film. Including B (boron) in the Ni film can increase hardness of the film and decrease electrical resistance of the film as compared to the case of including P (phosphorus) in the Ni film, and therefore it is possible to decide whether to include P (phosphorus) or B (boron) in the Ni film depending on the use of reaction vessels. Using hydrazine for the reducing agent provides an advantage that hydrogen gas is not generated during reaction unlike the case of using hypophosphorous acid or DMAB.

The amount of P (phosphorus) contained in the Ni film is appropriately determined according to the use of a reaction vessel. It is desirable that the chemical compositions be preferably 83 to 98% of Ni, 2 to 15% of P, and 0 to 2% of others. In the case of B (boron), it is desirable that the chemical compositions be preferably 97 to 99.7% of Ni, 0.3 to 3% of B, and 0 to 2.7% of others.

The electroless nickel plating may be conducted by ourselves since an electroless nickel plating solution itself is commercially available and the solution may be prepared by ourselves, but it is also possible to have a third party conduct the electroless nickel plating based on specifications to achieve the objects of the present invention. Electroless nickel plating solutions are manufactured by or commercially available from, for example, Tool System Co., Ltd., World Metal Co., Ltd., Metal Finishing Laboratory Co., Ltd., OKUNO CHEMICAL INDUSTRIES CO., LTD., and Uyemura & CO., LTD. Examples of companies conducting electroless nickel plating include Japan Kanigen Co., Ltd., Hitachi Kyowa Engineering Co., Ltd., SANWA PLATING INDUSTRY INCORPORATED COMPANY, Kodama Co., Shimizucho Metal Plating Industry Co., Ltd., Yamato Denki Ind. Co., Ltd., Nishina Industrial Co., LTD., and TOMASEIREN CO., LTD.

To provide an $NiF_2$ film on the PFA film-provided surface of a workpiece, a free surface of the Ni film provided on the PFA film-provided surface of the workpiece should be fluorinated. In a fluoridation process, a base material having the Ni film on its surface is placed in a vacuum vessel, and then $F_2$ gas is supplied to the vacuum vessel after reaching a predetermined degree of vacuum to expose the surface of the Ni film to the $F_2$ gas. In this case, by controlling the time of exposure to $F_2$ gas, it is possible to entirely fluorinate the Ni film to form an $NiF_2$ film or to forma two-layer film consisting of an Ni film at a lower portion and an $NiF_2$ film at an upper portion. It is also possible to change distribution of F atoms in a thickness direction of the film. For example, it is also possible to continuously reduce a distribution amount of F atoms in the film from the free surface toward the lower portion of the film. In this case, it is possible to increase adhesion between the base material and the film and adhesion between the PFA film and the film. Needless to say, the $NiF_2$ film obtained by fluorinating the Ni film including P (phosphorus) or B (boron) as described above includes P (phosphorus) or B (boron) in the above chemical compositions.

In the case of providing the Ni film or the Ni-based film as the base film, after being subjected to electroless plating, the film is annealed at a predetermined temperature for a predetermined time in an atmosphere such as a noble gas or nitrogen gas, so that adhesion strength of the film to the base material and hardness of the film are greatly increased. Therefore, this is a preferable post-treatment method of the base film in the present invention.

In the present invention, it is desirable that annealing be performed for about one hour in a nitrogen atmosphere at a temperature in the range of 260° to 350° C., for example.

To provide an $Al_2O_3$ film as the base film on the PFA film-provided surface of a workpiece made of aluminum, an anodic oxidation method capable of forming a non-porous $Al_2O_3$ film is preferably used. A film formed by the anodic oxidation method is formed at least on the PFA film-provided surface of the workpiece by the anodic oxidation method which will be described later. The $Al_2O_3$ anodic oxide film is a film of metal oxide including aluminum as a main component, and a film having a thickness of 10 nm or larger can be easily formed. Since this film is a passive film, it exhibits high performance as a protective film when formed on an inner surface of an aluminum reaction vessel body.

The thickness of the $Al_2O_3$ anodic oxide film is preferably 100 μm or smaller. The larger the film thickness, the more frequently cracks occur and the more easily outgas is released. Therefore, the thickness of the $Al_2O_3$ anodic oxide film is preferably 10 μm or smaller, more preferably 1 μm or smaller, still more preferably 0.8 μm or smaller, and particularly preferably 0.6 μm or smaller. The lower limit of the film thickness is 10 nm or larger. If the film thickness is smaller than 10 nm, it becomes impossible to obtain sufficient corrosion resistance. The thickness of the $Al_2O_3$ anodic oxide film is preferably 20 nm or larger, more preferably 30 nm or larger.

The non-porous $Al_2O_3$ film used in the present invention has an advantage that, despite being a thin film, it has an excellent corrosion resistance and has no or almost no (substantially no) micropores or pores as compared to a conventional porous $Al_2O_3$ film having a porous structure, and thus does not adsorb or hardly adsorbs water or the like.

The $Al_2O_3$ anodic oxide film can be obtained by anodic oxidation of an aluminum vessel body or an inner surface of a structure by using a chemical conversion solution having a pH of 4 to 10. This method has an advantage that a dense non-porous anodic oxide film can be easily obtained.

This method has another advantage that a dense smooth anodic oxide film can be formed since the method has a function of repairing a defect caused by unevenness of a metal surface. It is desirable that the lower limit of the pH of the chemical conversion solution be 4 or greater as described above, preferably 5 or greater, and more preferably 6 or greater. It is desirable that the upper limit of the pH of the chemical conversion solution be normally 10 or smaller, preferably 9 or smaller, and more preferably 8 or smaller. To certainly prevent the $Al_2O_3$ anodic oxide film formed by anodic oxidization from being dissolved into the chemical conversion solution, it is desirable that the pH of the chemical conversion solution be neutral or nearly neutral, or as close to neutral as possible.

In the present invention, the chemical conversion solution preferably has a pH in the range of 4 to 10 so as to maintain the pH within a predetermined range by buffering variation in concentration of various substances during the anodic oxidation (buffering action). Accordingly, it is preferable to include a compound (hereinafter also referred to as "compound (A)") such as an acid or a salt that exhibits a buffering action. The type of such a compound is not particularly limited, but at least one selected from the group consisting of preferably boric acid, phosphoric acid, organic carboxylic acid, and salts thereof is preferable in terms of high solubility in the chemical conversion solution and high solution stability. More preferably, the compound is an organic carboxylic acid or its salt with almost no residual boron or phosphorus element in the anodic oxide film.

The concentration of the compound A is selected appropriately depending on the purpose, and is normally 0.01% by mass or more, preferably 0.1% by mass or more, and more preferably 1% by mass or more relative to the entire chemical conversion solution. It is preferable to increase the concentration in order to increase the electrical conductivity and sufficiently form the anodic oxide film. However, the concentration of the compound A is set to normally 30% by mass or less, preferably 15% by mass or less, and more preferably 10% by mass or less. In order to maintain high performance of the anodic oxide film and to suppress its cost, it is preferable that the concentration be not greater than the above.

The chemical conversion solution used in the present invention preferably contains a non-aqueous solvent. If the chemical conversion solution containing the non-aqueous solvent is used, there is an advantage that the treatment can be carried out with high throughput since the time required for constant electric current chemical conversion can be shortened as compared with the case where an aqueous-based chemical conversion solution is used. If an aqueous solution is used as the chemical conversion solution, the anodic oxide film is etched by OH ions generated by electrolysis of water to become porous, and therefore it is preferable to use a main solvent having a low dielectric constant to suppress the electrolysis of water.

The type of non-aqueous solvent is not particularly limited as long as it is capable of favorable anodic oxidation and has a sufficient solubility to solute, but is preferably a solvent having one or more alcoholic hydroxy groups and/or one or more phenolic hydroxy groups or an aprotic organic solvent. In particular, a solvent having one or more alcoholic hydroxy groups is preferable in terms of storage stability.

Examples of compounds having one or more alcoholic hydroxy groups include a monohydric alcohol such as methanol, ethanol, propanol, isopropanol, 1-butanol, 2-ethyl-1-hexanol, and cyclohexanol; a dihydric alcohol such as ethylene glycol, propylene glycol, butane-1,4-diol, diethylene glycol, triethylene glycol, and tetraethylene glycol; and a trihydric or higher polyhydric alcohol such as glycerin and pentaerythritol. It is also possible to use a solvent having a functional group other than an alcoholic hydroxy group in a molecule. In particular, it is preferable to use a compound having two or more alcoholic hydroxy groups in terms of miscibility with water and vapor pressure, more preferably a dihydric alcohol and a trihydric alcohol, and particularly preferably ethylene glycol, propylene glycol, and diethylene glycol.

The compounds having alcoholic hydroxy groups and/or phenolic hydroxy groups may have other functional groups in the molecule. For example, it is possible to use a solvent having alkoxy groups as well as alcoholic hydroxy groups, such as methyl cellosolve and cellosolve.

As an aprotic organic solvent, either a polar solvent or a non-polar solvent may be used.

Examples of the polar solvent include, but are not limited to, cyclic carboxylic acid esters such as γ-butyrolactone, γ-valerolactone, and δ-valerolactone; chain carboxylic acid esters such as methyl acetate, ethyl acetate, and methyl propionate; cyclic carbonate esters such as ethylene carbonate, propylene carbonate, butylene carbonate, and vinylene carbonate; chain carbonate esters such as dimethyl carbonate, ethyl methyl carbonate, and diethyl carbonate; amides such as N-methylformamide, N-ethylformamide, N,N-dimethylformamide, N,N-diethylformamide, N-methylacetamide, N,N-dimethylacetamide, and N-methylpyrrolidone; nitriles such as acetonitrile, glutaronitrile, adiponitrile, methoxy acetonitrile, and 3-methoxypropionitrile; and phosphoric acid esters such as trimethyl phosphate and triethyl phosphate.

Examples of the non-polar solvent include, but are not limited to, hexane, toluene, and silicone oil.

Among the above solvents, one solvent may be used alone or two or more solvents may be used in combination. As the non-aqueous solvent of the chemical conversion solution for use in the formation of an anodic oxide film, ethylene glycol, propylene glycol, or diethylene glycol is particularly preferable and these may be used alone or in combination. In addition, the solvent may contain water if a non-aqueous solvent is contained.

The content of the non-aqueous solvent is normally 10% by mass or more, preferably 30% by mass or more, more preferably 50% by mass or more, and particularly preferably 55% by mass or more relative to the entire chemical conversion solution. The content of the non-aqueous solvent is normally 95% by mass or less, preferably 90% by mass or less, and particularly preferably 85% by mass or less.

When the chemical conversion solution contains water in addition to the non-aqueous solvent, as the lower limit, the content of the water relative to the entire chemical conversion solution is normally 1% by mass or more, preferably 5% by mass or more, more preferably 10% by mass or more, and particularly preferably 15% by mass or more, while, as the upper limit, is normally 85% by mass or less, preferably 50% by mass or less, and particularly preferably 40% by mass or less.

As the lower limit, the ratio of the water to the non-aqueous solvent is preferably 1% by mass or more, preferably 5% by mass or more, more preferably 7% by mass or more, and particularly preferably 10% by mass or more, while, as the upper limit, is normally 90% by mass or less, preferably 60% by mass or less, more preferably 50% by mass or less, and particularly preferably 40% by mass or less.

The chemical conversion solution may contain another additive as needed. For example, an additive for improving film formation properties and film properties of the anodic oxide film may be contained. The additive is not particularly limited, but may be a known additive used in chemical conversion solutions, or one or more components may be selected and added from the components other than a component of the known additive. At the same time, the amount of the additive is not particularly limited, but may be any appropriate amount in view of its effect, cost, or the like.

An electrolytic method for anodic oxidation is not particularly limited. As a current waveform, it is possible to use, for example, other than a direct current, a pulse method in which the applied voltage is periodically turned on and off, a PR method in which the polarity is reversed, an alternating current, an AC/DC superimposed current, an imperfectly-rectified current, a modulation current such as a triangular wave, or the like. Preferably, the direct current is used.

A method of controlling current and voltage of the anodic oxidation is not particularly limited. It is possible to appropriately combine the conditions for forming the oxide film on the inner surface of an aluminum alloy vessel body 1. Generally, anodic oxidation is preferably carried out at a constant current and at a constant voltage. That is, it is preferable that chemical conversion be carried out at a constant current until a predetermined chemical conversion voltage Vf is reached and, after the chemical conversion voltage is reached, anodic oxidation be carried out with the reached chemical conversion voltage maintained for a fixed time.

In this event, in order to efficiently form the oxide film, the current density is normally set to 0.001 mA/cm$^2$ or more, preferably to 0.01 mA/cm$^2$ or more. However, in order to obtain an oxide film with excellent surface flatness, the current density is normally set to 100 mA/cm$^2$ or less, preferably to 10 mA/cm$^2$ or less.

Further, the chemical conversion voltage Vf is normally set to 3 V or more, preferably to 10 V or more, and more preferably to 20 V or more. Since the thickness of the oxide film to be obtained is related to the chemical conversion voltage Vf, it is preferable to apply the above voltage or higher in order to give a certain thickness to the oxide film. However, it is normally set to 1000 V or less, preferably to 700 V or less, and more preferably to 500 V or less. Since the oxide film to be obtained has high dielectric properties, it is preferable to perform the anodic oxidation at the above voltage or less in order to form the high-quality oxide film without causing dielectric breakdown.

Incidentally, it is also possible to use a method in which an AC power supply with a constant peak current value is used instead of a DC power supply until a chemical conversion voltage is reached and, when the chemical conversion voltage is reached, the AC power supply is switched into a DC power supply, and the voltage is held for a fixed time.

Other conditions of anodic oxidation are not particularly limited. However, the temperature at the time of anodic oxidation is set within a range in which a chemical conversion solution stably exists as a solution. The temperature is normally −20° C. or higher, preferably 5° C. or higher, and more preferably 10° C. or higher. In consideration of production and energy efficiencies at the time of anodic oxidation, it is preferable to perform anodic oxidization at the above temperature or higher. However, the temperature is normally 150° C. or lower, preferably 100° C. or lower, and more preferably 80° C. or lower. In order to perform uniform anodic oxidization while maintaining the compositions of the chemical conversion solution, it is preferable to perform the anodic oxidization at the above temperature or lower.

The anodic oxidization preferably includes a first step of placing the inner surface of the base material consisting of aluminum and an electrode (for example, a platinum electrode) facing the base material in the chemical conversion solution, a second step of causing a constant current to flow from the aluminum-based material to the electrode for a predetermined time, and a third step of applying a constant voltage between the aluminum-based material and the electrode for a predetermined time. The predetermined time in the second step is preferably a time required for a voltage between the aluminum-based material and the predetermined electrode to reach a predetermined level (for example, 200V in the case of using ethylene glycol).

The predetermined time in the third step is preferably a time required for the current between the aluminum-based material and the predetermined electrode to reach a predetermined level. The current level dramatically decreases if the voltage reaches the predetermined level, and then gradually decreases over time (referred to as "residual electric current"). A time required for the current level to reach the predetermined current level to complete the constant voltage application is, for example, 24 hours. However, the obtained $Al_2O_3$ anodic oxide film has the same film quality as that of a heat-treated film. The smaller the residual electric current is, the higher the film quality of the $Al_2O_3$ anodic oxide film is. In view of the above, to increase productivity, it is preferable to stop the constant voltage application in an appropriate time and perform heat treatment (annealing) in a subsequent step. It is desirable that the heat treatment be performed at a temperature of preferably 150° C. or higher, more preferably about 300° C., for 0.5 to one hour. Although a duration time of the residual electric current depends on the duration of the residual electric current, the constant voltage application may be continued if the duration time of the residual electric current is not too long. If the duration time is long, the constant voltage application may be switched to the heat treatment.

In the second step, it is desirable that a current of normally 0.01 to 100 mA, preferably 0.1 to 10 mA, and more preferably 0.5 to 2 mA is caused to flow per square centimeter.

The voltage in the third step is set to, as already described, a voltage at which electrolysis of the chemical conversion solution does not occur.

Although not adhering to any theories, it is believed that the non-porous $Al_2O_3$ anodic oxide film formed in the chemical conversion has an amorphous structure across the film and has almost no crystal grain boundaries or the like based on the knowledge of the present inventors. It is presumed that, by further adding a compound having the buffering action and using the non-aqueous solvent as a solvent, a very small quantity of carbon component is trapped into the anodic oxide film to weaken the Al—O binding strength, thereby stabilizing the amorphous structure of the entire film.

The $Al_2O_3$ anodic oxide film thus manufactured may preferably be heat-treated for the purpose of completely removing water in the film, or the like. In particular, an Al anodic oxide film formed on the aluminum alloy-based material containing high-purity aluminum as a main component with almost no amount of the above-mentioned specific elements contained therein is higher in thermal stability, and is hardly subjected to formation of voids, gas pools, or the like. Therefore, voids or seams hardly occur in the Al anodic oxide film even in annealing at about 300° C. or higher. Therefore, it is possible to suppress generation of particles and dissolution of aluminum into a reaction liquid due to exposure of the aluminum.

The temperature of the heat treatment is not particularly limited, but is normally 100° C. or higher, preferably 200° C. or higher, and more preferably 250° C. or higher. In order to sufficiently remove water on the surface of and inside the $Al_2O_3$ anodic oxide film by the heat treatment, it is preferable to perform the treatment at a temperature not lower than the above-mentioned temperature. However, the temperature of the heat treatment is normally 600° C. or lower, preferably 550° C. or lower, and more preferably 500° C. or lower. It is preferable to perform the treatment at the above-mentioned temperature in order to hold the amorphous structure of the $Al_2O_3$ anodic oxide film and maintain the flatness of the surface.

The heat treatment time is not particularly limited, and may be appropriately set in consideration of the surface roughness due to the heat treatment, the productivity, and the like. The heat treatment time is normally one minute or more, preferably five minutes or more, and particularly preferably 15 minutes or more. In order to sufficiently remove water on the surface of and inside the $Al_2O_3$ anodic oxide film, it is preferable to perform the heat treatment for the time not less than the above-mentioned time. However, the heat treatment time is normally 180 minutes or less, preferably 120 minutes or less, more preferably 60 minutes or less. It is preferable to perform the heat treatment for the time not more than the above-mentioned time in order to maintain the $Al_2O_3$ anodic oxide film structure and the surface flatness.

A gas atmosphere in a furnace during the annealing is not particularly limited, and normally, nitrogen, oxygen, a mixed gas thereof, or the like may appropriately be used. In particular, the oxygen concentration of the atmosphere is preferably 18% by volume or more, more preferably 20% by volume or more, and most preferably 100% by volume.

On a backing surface on which the PFA film is directly provided, it is preferable to perform primer treatment of PFA when the PFA film is provided to increase adhesion to the backing surface.

In the present invention, to ensure a desirable smoothness of a surface on which the PFA film is provided, the thickness of a base film is appropriately selected in view of smoothness of the PFA film-provided surface of the base material, an average particle size of the PFA powder to be used, and an average particle size of PFA particles diffused in the PFA coating.

In the present invention, it is desirable that the thickness of the base film be preferably 0.1 to 30 μm, more preferably 1 to 20 μm, and more preferably 2 to 15 μm.

It is preferable to provide a PFA film on the PFA film-provided surface of a workpiece or on the surface of the base film (collectively referred to as a "PFA film formation surface") in the following manner, as in Experiments 1 and 2 and the example which will be described later.

The forms of PFA to be prepared for forming a PFA film include: a fine powder for use in electrostatic coating and a liquid as the general coating. In the present invention, the fine powder for use in electrostatic coating is preferable since a coating film having a uniform thickness can be easily formed even if the workpiece is relatively complex and rough in shape.

As a coating method, spray coating is preferably used in the case of applying a liquid coating as the general coating. However, depending on the base material, dip coating, dip spin coating, roll coating, or spin flow coating is appropriately used. Electrostatic powder coating or an electrostatic fluidized bed method is preferably used for applying a powder coating.

The PFA coating applied in such a manner is baked on the PFA film formation surface of the workpiece. At the same time, melting and remelting steps are given, and finally, a PFA coating film having a desirable smoothness can be obtained.

A method for forming a coating film on the PFA film formation surface of the workpiece depends on the type of base material, uses, and the type of selected coating, but preferably includes the following steps:
(1) Preparing a metal-based material (a member to be coated after being subjected to electropolishing)
(2) Degreasing or baking
(3) Roughening (blasting) and/or forming a base film
(4) Cleaning
(5) Primer coating
(6) Predrying
(7) Topcoat (PFA) coating
(8) Predrying
(9) Primary firing (melting)
(10) Primary cooling (cooling to a temperature below a melting point of the PFA used)
(11) Secondary firing (remelting)
(12) Secondary cooling (cooling to room temperature)

In the case of providing a thick topcoat layer, the above steps of "(7) Topcoat (PFA) coating, (8) Predrying, and (9) Primary firing (melting)" are repeated to form a topcoat layer having a desirable thickness. In this case, a coating thickness per process is appropriately set depending on the form (powder or coating) of PFA to be used, viscosity at the time of melting treatment, and in the case of coating, dispersion concentration and particle size, while in the case of powder, particle size of the powder, or the like.

In the present invention, a coating thickness of 1 to 100 μm is preferable.

In a case where coating is performed multiple times, a primary firing temperature in the first and intermediate coating is set as an intermediate primary firing temperature, and a primary firing temperature in the final coating is set as a final primary firing temperature.

Depending on the type of PFA and the frequency of coating, the intermediate primary firing temperature and the final primary firing temperature are occasionally set to the same temperature, but it is desirable that the intermediate primary firing temperature preferably be set to a temperature lower than the final primary firing temperature.

Steps (3), (5), and (6) are occasionally omitted. For example, in a case where there is a sufficient adhesion between the surface of a workpiece and the surface of a topcoat even if the topcoat is directly provided on the surface of the workpiece, steps (3), (5), and (6) may be omitted. In a case where primer coating allows the base material to firmly adhere to the topcoat via the primer, step (3) may be omitted.

The primary firing temperature and firing time in the present invention are important factors in the secondary firing to obtain a sufficient smoothness to achieve the objects of the present invention, and are appropriately determined depending on the PFA and metal workpiece to be used and determination of the primer to be adopted as needed.

It is desirable that the primary firing temperature and firing time in the present invention be set to a sufficient temperature and time to discharge impurities (low molecular weight components, components having unfluorinated terminal groups, products in the middle of synthesis, additives such as a surfactant, or the like) contained in PFA materials (available in the form of powder or coating) from the coated PFA film by the primary firing. It is desirable that the upper limit of the primary firing temperature be set to a temperature at which the PFA having a molecular weight required for forming a PFA film giving a high smoothness is not decomposed (expressed as "PFA decomposition temperature"), or a temperature slightly higher than the decomposition temperature (expressed as "Th"). Th is determined in connection with the time for keeping the PFA coating film at the primary firing temperature.

Th in the present invention is preferably set to a temperature higher than the melting point of the PFA to be used by 30° to 70° C. If the set temperature is too low, a sufficient smoothness may not be obtained in the secondary firing, while if the set temperature is too high, decomposition of the PFA may be promoted. It is desirable to set a temperature of preferably 35° to 60° C., more preferably 40° to 50° C.

The primary firing time in the present invention consists of a time required to increase the temperature up to the primary firing temperature (primary firing heat-up time) and a time required to hold the primary firing temperature (primary firing temperature holding time). During the primary firing heat-up time, the heat-up speed is controlled by a control device so that heat is equally transmitted across the PFA coating film and the PFA coating film is uniformly fired. During the primary firing temperature holding time, the entire free surface of the PFA coating film is controlled to be dissolved as uniformly as possible to minimize the visual recognition of positional nonuniformity. In the present invention, since the primary firing temperature holding time varies depending on the thickness and size of the PFA coating film, the primary firing temperature holding time is appropriately set each time based on the thickness and size of the PFA coating film. The primary firing temperature holding time is set to preferably 10 to 50 minutes, more preferably 15 to 40 minutes.

Since smoothness of the film obtained by the secondary firing varies depending on the settings of the firing temperature, the heat-up speed up to the firing temperature, and the holding time at the firing temperature in the primary firing, the firing temperature, the heat-up speed up to the firing temperature, and the holding time at the firing temperature in the primary firing are appropriately set in full consideration of the base material, PFA, and the thickness and size of the PFA coating film.

In the primary firing, it is believed that impurities contained in the PFA materials (available in the form of powder or coating) are decomposed and removed from the PFA film. By removing needless impurities from the PFA film in the primary firing, smoothness of the PFA film after the secondary firing is significantly improved.

In the present invention, the primary firing is performed in a mixed gas atmosphere of a noble gas and oxygen, such as a gas atmosphere of 20% by volume of $O_2/Ar$.

It is preferable to use a mixed gas of a noble gas and oxygen as the atmosphere gas in the primary firing, but the atmosphere gas in the present invention is not limited thereto. An oxygen gas alone or a mixed gas of nitrogen and oxygen may be used.

At the time of completion of the primary firing, a sample is cooled to a temperature not higher than the melting point of the PFA to be used (expressed as "Tl") and solidified (primary cooling and solidification). In this event, it is desirable that the temperature Tl not higher than the melting point be set to a temperature below the melting point of the PFA to be used by preferably 5° to 60° C., more preferably 10° to 50° C., and still more preferably 20° to 50° C. In a case where the melting point widely varies depending on molecular weight distribution of PFA, mixture of a plurality of types of PFA having different molecular weights, or the like, a desirable primary firing temperature is appropriately selected within the above range relative to the lowest temperature in the temperature range of the various melting points.

If the difference between the primary firing temperature and the lowered temperature below the melting point of PFA is too small, solidification may not be performed smoothly. Meanwhile, if the difference is too large, an excessive time is required to reach the remelting, thus reducing the production efficiency.

The heat-up speed from the temperature Tl (primary cooling and solidification temperature) below the melting point up to the secondary firing temperature and the holding time for keeping the secondary firing temperature are set so as to ensure a sufficient smoothness of the free surface of the PFA film to be obtained after the secondary cooling down to room temperature.

The secondary firing temperature is a temperature required for remelting the solidified PFA film after the primary firing and for promoting the smoothing of the PFA film during the solidification after the process in which the temperature is lowered to room temperature at which the PFA coating film is subjected to the next treatment after the primary firing.

The secondary firing is preferably performed at a high temperature equal to the melting point of the PFA to be used or at most 15° C. higher than the melting point. More preferably, the secondary firing is performed at a temperature equal to the melting point of the PFA to be used or slightly lower or higher than the melting point.

Next, examples of the melting and remelting steps will be described. In a case where Rf in the structural formula 1 is "—$CF_2CF_2CF_3$" (the melting point is 310° C.), for example, the PFA film formation surface of the workpiece is coated with PFA fine powder by using electrostatic coating to form a PFA film having a predetermined thickness, heated to 345° C. at a programmed heating rate, and held for 30 minutes at a temperature of 345° C. (melting step). The melting step is performed in a gas atmosphere of 20% by volume of $O_2$/Ar. Then, the atmosphere is switched to an atmosphere of 100% by volume of argon, and the temperature is lowered to 280° C. at a predetermined rate and kept for 30 minutes at 280° C. Then, the PFA film is heated again to 310° C. at a predetermined rate (remelting step) and the temperature is held at 310° C. for 30 minutes. After holding the temperature at 310° C. for 30 minutes, heating is stopped and the PFA film is left by itself until the temperature is lowered to room temperature. After such melting and remelting steps, a PFA film having a free surface of an excellent smoothness can be obtained.

In the case of PFA including Rf of "—$CF_2CF_2CF_3$," the melting starts at a temperature between 295° and 305° C., although it is said that the melting point is 310° C. Accordingly, as the temperature in the remelting step, a temperature in the range of 295° to 315° C. can be selected. It is preferable to select a temperature in the range of 305° to 315° C.

Furthermore, although the largest smoothness can be obtained at a temperature of 310° C. or slightly lower or higher than the melting point of 310° C., it is preferable to perform remelting at a temperature in the range of 305° to 315° C. so as to obtain smoothness suitable for the objects of the present invention.

Experiment 1: Experiment on Melting and Remelting of PFA and Smoothness Measurement Two plate-like SUS-based materials (SUS316L-EP: 10×10 mm², thickness: 2 mm) (base materials 1 and 2) were prepared on which predetermined cleaning was performed after mirror polishing. Surface smoothness of mirror finished surfaces of these base materials was measured by using a commercially available profilometer (Dektak 6M available from Veeco Instruments Inc.). Both base materials had a surface roughness Ra of 0.006 μm.

On a surface of one of them (base material 1) whose surface smoothness was measured, an Ni film (thickness: 2 μm) was provided by electroless plating. Conditions of the electroless plating were as follows:

Electroless plating solution (A): nickel sulfate . . . 26.3 g/l
Sodium hypophosphite . . . 21.2 g/l
  Citrate . . . 25.0 g/l
  Acetate . . . 12.5 g/l
  Rochelle salt . . . 16.0 g/l
  Urea . . . 12.5 g/l
  pH . . . 6.0
  Bath temperature . . . 80° C.

Before immersing in a bath of the electroless plating solution (A) to form an Ni film, the following treatment was performed on the mirror finished surface of the base material 1.

The base material 1 was immersed in a commercially available degreasing agent (OPC-370 Condiclean M (trademark) available from OKUNO CHEMICAL INDUSTRIES CO., LTD.) at 60° C. for five minutes. Then, the base material 1 was taken out of the degreasing agent and its mirror finished surface was sufficiently cleaned with ultrapure water for semiconductors. Then, the base material 1 was immersed in a commercially available catalyst imparting agent (OPC-80 Catalyst (trademark) available from OKUNO CHEMICAL INDUSTRIES CO., LTD.) at 25° C. for five minutes. Then, the base material 1 was taken out of the catalyst imparting agent and its mirror finished surface was sufficiently cleaned with ultrapure water for semiconductors. After the cleaning, the base material 1 was immersed in a commercially available activation liquid (OPC-505 Accelerator (trademark) available from OKUNO CHEMICAL INDUSTRIES CO., LTD.) at 35° C. for five minutes. Then, the base material 1 was taken out of the activation liquid and its mirror finished surface was sufficiently cleaned with ultrapure water for semiconductors.

The base material 1 treated in the above manner was immersed in the electroless plating solution (A) for 70 minutes. Then, the base material 1 was taken out of the electroless plating solution (A) and sufficiently cleaned with ultrapure water for semiconductors. In visual observation, the Ni film was uniformly formed on the entire mirror finished surface, and its free surface was extremely smooth when touched by fingers.

Smoothness of the free surface of the Ni film was measured by using a commercially available device, and the surface roughness was Ra=0.006 μm, which was almost the same as that of the mirror finished surface of the base material.

The base materials 1 and 2 on which the Ni film was provided in the above manner were immersed for degreasing in the commercially available degreasing agent (OPC-370 Condiclean M (trademark) available from OKUNO CHEMICAL INDUSTRIES CO., LTD.) at 60° C. for five minutes. Then, the base materials 1 and 2 were taken out of the degreasing agent and sufficiently cleaned with ultrapure water for semiconductors. To the Ni film surface (free surface of the Ni film) of the base material 1 thus treated and the surface (mirror finished surface) of the base material 2 whose smoothness was measured, a precoat material (primer) was applied and dried under the following conditions:

Precoat material (primer): EK-1908S21L (available from Daikin Industries LTD.)
Coating conditions:
  Nozzle diameter of a spray gun . . . 1.2 mmϕ
  Spraying pressure . . . 0.3 MPa
  Drying conditions: 85° C., 15 minutes Next, on the precoat material-applied surfaces of the base materials 1 and 2, a film of PFA powder was provided to have a thickness of 20 μm by using electrostatic coating under the following conditions, and then, the base materials were placed in a vessel made of quartz (quartz vessel) installed in an infrared heating furnace.

Topcoat material: AC-5600 (available from Daikin Industries LTD.)
Electrostatic coating device (available from Ransburg Industrial Finishing K.K.):
  Hand gun . . . REA90/L
  High pressure controller . . . 9040
Frequency of coating . . . three times
Coating amount per coating . . . 120±10 μm
Intermediate firing between coatings . . . about 340° C., 15 minutes In the infrared heating furnace as used in the present experiment, 100% argon is allowed to flow constantly at a flow rate of 1 l/min in the quartz vessel installed therein, even when the furnace is not in use, to maintain its cleanliness.

In the infrared heating furnace, a thermocouple is installed on the periphery of the quartz vessel, and an output of an infrared light source is controlled by a temperature controller to obtain a programmed temperature based on the temperature information from the thermocouple.

In the vessel made of quartz, a gas tube for introducing gas from the outside of the furnace is arranged, and it is possible to control the furnace to have a desirable atmosphere by introducing gas, for example, 100% by volume of argon or a mixture of 20% by volume of oxygen and argon into the furnace.

The two base materials 1 and 2 which were subjected to the PFA coating treatment were placed in the quartz vessel, and its opening and closing door was closed to have an air shut-off condition to start feeding of a gas of 20% by volume of O₂/Ar into the infrared heating furnace at a flow rate of 1 l/min. This condition was maintained until the atmosphere temperature in a space close to the quartz vessel location and the temperature in the quartz vessel were held constant. After the temperatures were held constant, the infrared light source was turned on. The temperature in the quartz vessel immediately before turning on the infrared light source was 25° C. Then, the output of the infrared light source was gradually increased to substantially linearly raise the temperature to reach 345° C. in one hour. Then, the temperature was kept at 345° C. for 30 minutes. Then, the atmosphere was switched to a gas of 100% by volume of argon, and the gas was allowed to flow at a flow rate of 5 l/min for ten minutes to have the temperature in the quartz vessel reach 280° C. This condition was kept for 30 minutes. In the visual observation, the PFA treated surfaces of the base materials 1 and 2 were rough. After maintaining the condition for 30 minutes, the flow rate of the gas of 100% by volume of argon was switched to 1 l/min, and the temperature was raised from 280° to 310° C. in six minutes. When the temperature reached 310° C., the output of the infrared light source was controlled, and the condition was kept for 30 minutes. Then, the quartz vessel was taken outside, and the base materials 1 and 2 were placed in a desiccator to cool naturally.

In the visual observation, the PFA treated surfaces of the base materials 1 and 2 at this point were close to a mirror surface condition.

Figure 3:
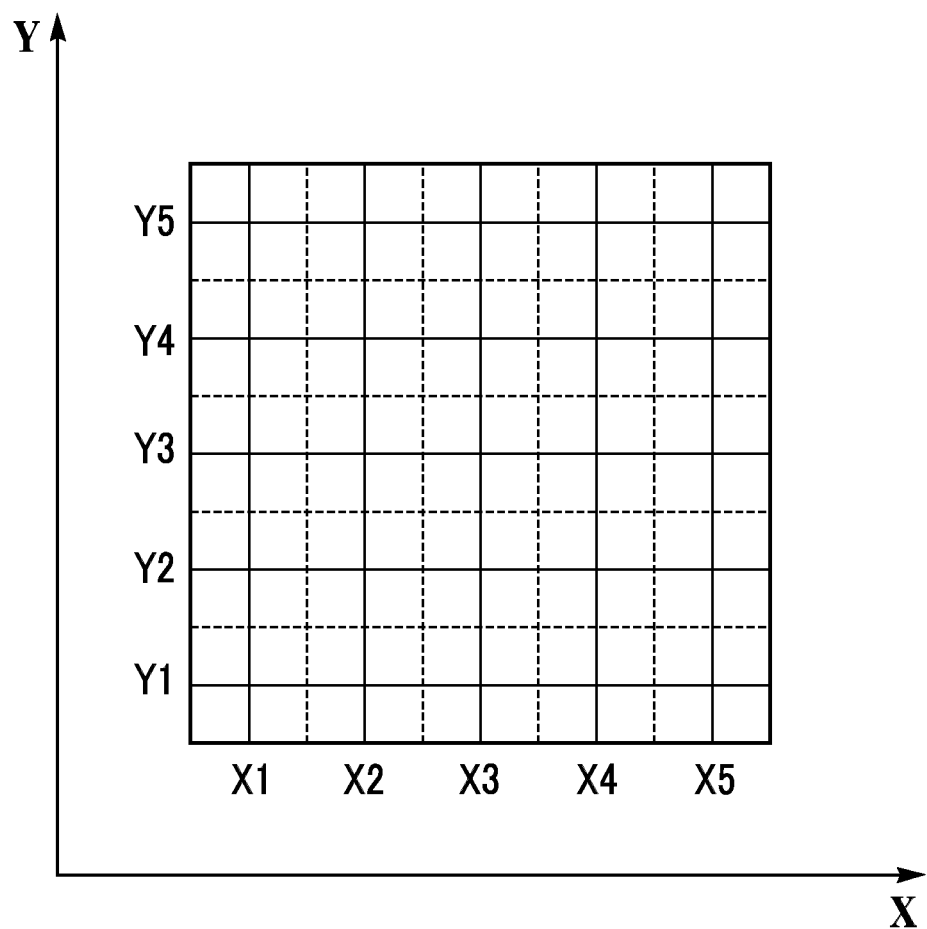
FIG. 3 illustrates measurement areas of smoothness in Experiment 1.

After fully and naturally cooling to room temperature, the base materials 1 and 2 were set on a surface roughness measurement device to measure smoothness of the PFA surface. Hereinafter, for convenience, the PFA film on the base material 1 and the PFA film on the base material 2 were called a sample 1-1 and a sample 1-2, respectively. The free surface of the PFA film of each sample was divided into five for each side per 2 cm in a horizontal direction (referred to as "in an X-axis direction" for convenience), and the divided surfaces of the sample were measured on the straight line from one end to the other end. Then, the free surface of the PFA film of each sample was divided into five per 2 cm also in a vertical direction (referred to as "in a Y-axis direction" for convenience), and smoothness was measured for each divided area (see FIG. 3).

The measurement results are shown in Table 1.

TABLE 1

| X direction | Surface roughness Ra (μm) | Y direction | Surface roughness Ra (μm) |
|---|---|---|---|
| X1 | 0.006 | Y1 | 0.006 |
| X2 | 0.006 | Y2 | 0.006 |
| X3 | 0.006 | Y3 | 0.006 |
| X4 | 0.006 | Y4 | 0.006 |
| X5 | 0.006 | Y5 | 0.006 |

Experiment 2

Other than using semi-cylindrical base materials whose inner surface is a cylindrical concave surface (radius of curvature: 5 cm) instead of the plate-like base materials used in Experiment 1, the same conditions as those in Experiment 1 were set, and the base materials were subjected to Ni treatment and PFA treatment to obtain a sample 2-1 (which was subjected to Ni treatment) and a sample 2-2 (which was not subjected to Ni treatment) for smoothness measurement. Smoothness of the samples was measured in the same manner as in Experiment 1. The measurement results are shown in Tables 2-1 and 2-2.

TABLE 2-1

(Sample 2-1)

| X direction | Surface roughness Ra (μm) | Y direction | Surface roughness Ra (μm) |
|---|---|---|---|
| X1 | 0.006 | Y1 | 0.006 |
| X2 | 0.006 | Y2 | 0.006 |
| X3 | 0.006 | Y3 | 0.006 |
| X4 | 0.006 | Y4 | 0.006 |
| X5 | 0.006 | Y5 | 0.006 |

TABLE 2-2

(Sample 2-2)

| X direction | Surface roughness Ra (μm) | Y direction | Surface roughness Ra (μm) |
|---|---|---|---|
| X1 | 0.006 | Y1 | 0.006 |
| X2 | 0.006 | Y2 | 0.006 |
| X3 | 0.006 | Y3 | 0.006 |
| X4 | 0.006 | Y4 | 0.006 |
| X5 | 0.006 | Y5 | 0.006 |

Experiment 3: Experiment on Presence or Absence of Remelting of PFA Film and Smoothness Measurement Two plate-like SUS substrates (SUS316L-EP: 2 cm×5 cm) (samples 3-1 and 3-2) were prepared on which mirror polishing was performed, and an Ni film was provided on the mirror-polished surfaces of the SUS substrates in the same manner as in Experiment 1. Surface smoothness of the mirror-polished surfaces of the two SUS substrates and surface smoothness of the Ni film surface were measured in the same manner as in Experiment 1, and substantially the same results as those in Experiment 1 were obtained.

The Ni films on the two SUS substrates each having the Ni film provided thereon were coated with PFA by outsourcing according to the specification.

Contractor: NIPPON FUSSO CO., LTD.

Topcoat material: ACX-31 (available from Daikin Industries LTD.)

Coating method: Electrostatic coating

PFA coating thickness: 20 μm

Then, the two SUS substrates coated with PFA were subjected to firing treatment according to the following steps. The same firing furnace as the one used in Experiment 1 was used.

The SUS substrates on which a quartz grating was coated with PFA powder by electrostatic coating were placed in the quartz vessel, and firing was performed on the two samples in the following manner:

(1) 20% by volume of $O_2$/Ar is allowed to flow at a flow rate of 1 l/min and the temperature is raised from room temperature to 345° C. in one hour.

(2) The atmosphere is maintained and the temperature is kept at 345° C. for 30 minutes.

(3) 100% by volume of argon is allowed to flow at a flow rate of 5 l/min and the temperature is lowered to 280° C. in ten minutes. In this event, the sample 3-2 is moved to an unheated position to avoid causing a heating history (remelting).

(4) The atmosphere is maintained and the temperature is kept at 280° C. for 30 minutes.

(5) The flow rate of the atmosphere of 100% by volume of argon is switched to 1 l/min, and the temperature is raised from 280° to 310° C. in six minutes.

(6) The atmosphere is maintained and the temperature is kept at 310° C. for 30 minutes.

(7) The heating is stopped and the quartz grating (of the sample 3-1) is moved to an unheated position and allowed to cool naturally.

The temperature program is shown in the following table.

TABLE 3

| Step | Starting temperature | Target temperature | | Time (minute) |
|---|---|---|---|---|
| 1 | 25 | 345 | Raise temperature | 60 |
| 2 | 345 | 345 | Keep temperature | 30 |
| 3 | 345 | 280 | Lower temperature | 10 |
| 4 | 280 | 280 | Keep temperature | 30 |
| 5 | 280 | 310 | Raise temperature | 6 |
| 6 | 310 | 310 | Keep temperature | 30 |

Smoothness of the free surface of the PFA film of the sample 3-1 (with a remelting history) and the sample 3-2 (without a remelting history) on which the PFA film was formed was measured in the same manner as in Experiment 1, and it was observed that the sample 3-1 had an excellent smoothness and no waviness at all as shown by the following results.

Sample 3-1: Ra=0.061 µm, PV=0.302 µm
Sample 3-2: Ra=0.354 µm, PV=2.141 µm

Experiment 4: Experiment on Various Kinds of PFA

Other than using different topcoat materials under the conditions shown in Table 4, the same conditions as those in Experiment 1 were set, and the PFA film was provided on the mirror-polished surfaces of the plate-like SUS substrates to measure smoothness of the PFA film surface in the same manner as in Experiment 1. The measurement results are shown in Table 4.

Topcoat Materials
MP-310 (Du Pont-Mitsui Fluorochemicals Co., Ltd.)
EM-500CL (Du Pont-Mitsui Fluorochemicals Co., Ltd.)
EM-700CL (Du Pont-Mitsui Fluorochemicals Co., Ltd.)
AW-5000L (Daikin Industries LTD.)

TABLE 4

| Sample No. | Topcoat material | Base | Base material | Smoothness Ra (µm) |
|---|---|---|---|---|
| 41 | MP-310 | EK-1908S21L (Daikin Industries LTD.) | Same base material as in Experiment 1 | 0.006 |
| 42 | EM-500CL | EK-1908S21L (Daikin Industries LTD.) | Same base material as in Experiment 1 | 0.007 |
| 43 | EM-700CL | EK-1908S21L (Daikin Industries LTD.) | Same base material as in Experiment 1 | 0.007 |
| 44 | AW-5000L | EK-1908S21L (Daikin Industries LTD.) | Same base material as in Experiment 1 | 0.007 |

EXAMPLE

By cutting the SUS-based materials (SUS316L-EP), a pair of female and male screw rotors (outside diameter: 10 cm, length: 30 cm, the number of screw leads: three) each having a desirable screw portion provided thereon was prepared based on the design. In the same manner as in Experiment 1, after cleaning treatment was performed, an Ni film was provided on the inner surface of the screw portion and the top end surface.

Then, in the same manner as in Experiment 1, a PFA film was provided on the Ni film.

The female and male screw rotors thus processed were installed in the stator instead of female and male screw rotors of a screw pump used for an operating test, and the pump was assembled.

The width of the gap between the inner wall surface of the stator and the top end surface of the screw rotor was 20 µm.

The pump of the present invention prepared in this manner was tested for its pumping performance and the longtime, continuous rotation. The results are shown in Table 5.

In the same manner, cutting was performed to prepare five pairs of female and male screw rotors such that the gap between the inner wall surface of the stator and the top end surface of the screw rotor has widths of 15 µm and 10 µm, and Ni film formation and PFA film formation were performed thereon. Each pair of screw rotors was installed in the stator as the above-described manner to assemble the pump. The pumps were tested as in the above-described pump. The results are shown in Table 5.

For comparison, three pairs of female and male screw rotors were prepared by the same process as the above screw rotors except for not providing an Ni film and a PFA film, and the same pump test was performed. The results are shown in Table 5.

The pumps having screw rotors of samples 11 to 16 individually installed therein each maintained their initial smooth rotation even by the continuous rotation at 10,000 rotation/sec for 3,000 hours, without any trouble.

Meanwhile, the pump having the screw rotor of sample 17 installed therein did not have any trouble in rotation even by the continuous rotation at 10,000 rotation/sec for 3,000 hours within a range of general use as a pump. The pump having the screw rotor of sample 18 installed therein did not have any trouble in rotation even by the continuous rotation at 5,000 rotation/sec for 3,000 hours within a range of general use as a pump. However, in the case of continuous rotation at 10,000 rotation/sec, the pump developed a trouble in rotation after a lapse of 1,000 hours. Accordingly, the rotation was canceled immediately.

The pump having the screw rotor of sample 19 installed therein developed a trouble in rotation after a lapse of 1,000 hours by the continuous rotation at 5,000 rotation/sec. Accordingly, the operation was canceled immediately.

TABLE 5

| | Presence or absence of PFA | | | Gap | |
|---|---|---|---|---|---|
| Sample No. | Top end surface | Bottom end surface | Side inner wall surface | width (µm) | Pumping performance |
| 11 | Present | Present | Present | 20 | ⊙ |
| 12 | Present | Present | Present | 15 | ⊙ |
| 13 | Present | Present | Present | 10 | ⊙ |
| 14 | Present | Absent | Present | 15 | ⊙ |
| 15 | Present | Present | Absent | 15 | ⊙ |
| 16 | Present | Absent | Absent | 15 | ⊙ |
| 17 | Absent | Absent | Absent | 30 | ○ |
| 18 | Absent | Absent | Absent | 20 | Δ |
| 19 | Absent | Absent | Absent | 10 | Δ |

⊙: Very good
○: Good
Δ: Fair

INDUSTRIAL APPLICABILITY

According to the gas exhaust pump of the present invention, the pumping performance is particularly high as compared to a conventional pump of a similar type and it is possible to maintain a certain pumping performance without causing erroneous rotation by high-speed, continuous, and longtime operation, and therefore maintenance and inspection of the pump can be significantly reduced. Accordingly, since the production cost can be reduced, the present invention has a high industrial applicability.

REFERENCE SIGNS LIST

100 SCREW PUMP
101 FEMALE SCREW ROTOR
102 MALE SCREW ROTOR
103 SCREW PORTION
104 SCREW ENGAGING PORTION
105 ROTATING SHAFT
106 STATOR
107 ANGULAR BEARING
108 SEAL HOUSING
109 LUBRICATING OIL SUPPLY PATH
110 BASE PLATE
111 LUBRICATING OIL
112 LUBRICATING OIL RESERVOIR
113 SEAL MEMBER
114 SEAL GAS SUPPLY PATH
115 SEAL GAS DISCHARGE PATH
116 BEARING BODY
117 GAP
118 SEAL HOUSING INNER WALL SURFACE
119 OUTER SURFACE OF ROTATING SHAFT
120 PFA FILM
201 TOP END SURFACE
202 BOTTOM END SURFACE
203 INNER WALL SURFACE
204, 205 SIDE INNER WALL SURFACE

The invention claimed is:

1. A method for smoothing a film surface, comprising the steps of:
   (1) preparing a component having a film containing perfluoro alkoxy alkane (PFA) represented by formula 1

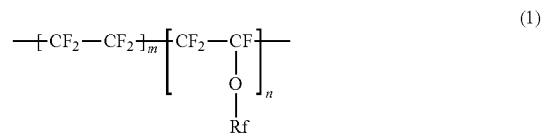

in which Rf is a perfluoro alkyl group and m and n are both positive integers, and the PFA has a melting point of 298° to 310° C.;
   (2) exposing the component to an atmosphere with a temperature 30° to 70° C. higher than a melting temperature of said PFA so as to melt at least a free surface area of the film;
   (3) exposing the component to the atmosphere with a temperature 5° to 60° C. lower than the melting temperature of said PFA so as to solidify at least a portion of said free surface area;
   (4) remelting said portion of said free surface area by exposing the component to the atmosphere at a temperature of at least the melting temperature of said PFA to 15° C. above said melting temperature; and
   (5) lowering a temperature of the atmosphere to room temperature so as to increase smoothness of the free surface area of the film, wherein
   the PFA film is provided on a $NiF_2$ film.

2. The method according to claim 1, wherein the component is a screw rotor for a gas exhaust screw pump.

3. The method according to claim 1, wherein the PFA has a molecular weight of from hundreds of thousands to one million.

4. The method according to claim 1, wherein the $NiF_2$ film includes P (phosphorus) or B (boron).

* * * * *